(12) United States Patent
Liu

(10) Patent No.: US 6,870,988 B2
(45) Date of Patent: *Mar. 22, 2005

(54) TAP OUTLET COLLIMATOR

(75) Inventor: Zhimin Liu, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/690,735

(22) Filed: Oct. 21, 2003

(65) Prior Publication Data

US 2004/0081397 A1 Apr. 29, 2004

Related U.S. Application Data

(62) Division of application No. 09/704,111, filed on Oct. 30, 2000, now Pat. No. 6,654,518.
(60) Provisional application No. 60/162,026, filed on Oct. 28, 1999.

(51) Int. Cl.$^7$ ................................................ G02B 6/32
(52) U.S. Cl. ...................................................... 385/34
(58) Field of Search .............................. 385/34, 11, 15, 385/33, 124, 36

(56) References Cited

U.S. PATENT DOCUMENTS

| | | | |
|---|---|---|---|
| 6,088,166 A | 7/2000 | Lee | ............................ 359/654 |
| 6,301,030 B1 | 10/2001 | Robinson | ..................... 359/122 |
| 6,400,508 B1 | 6/2002 | Liu | ............................. 359/495 |
| 6,654,518 B1 * | 11/2003 | Liu | .............................. 385/34 |

* cited by examiner

Primary Examiner—Khiem Nguyen
(74) Attorney, Agent, or Firm—Fish & Richardson P.C.

(57) ABSTRACT

This invention discloses an optical collimator that includes a built-in tap-out projection optical arrangement for projecting a portion of an incoming beam to a tap-out beam-transmission fiber. In one of the preferred embodiments, the built-in tap-out projection optical arrangement further includes a front surface having an incline angle for projecting a portion of an incoming beam to a tap-out beam transmission fiber. In another preferred embodiment, the built-in tap-out projection optical arrangement further includes a prism having a pair of inclined front surfaces for projecting the incoming beam into an output beam and a tap out beam. In yet another preferred embodiment, the built-in tap-out projection optical arrangement further includes a partially reflective front surface and a reflective mirror projecting the incoming beam into an output beam and a tap out beam. This invention disclosure a dual beam collimator that provides two parallel each other beam with adjustable distance between them in the same diameter as single beam collimator. The dual beam collimator can be expanded into multiple beam collimator also.

10 Claims, 2 Drawing Sheets

TAP OUTLET COLLIMATOR

This application is a divisional application of Ser. No. 09/704,111, filed on Oct. 30, 2000 now U.S. Pat. No. 6,654,518, which claims priority from provisional application No. 60/162,026, filed on Oct. 28, 1999.

FIELD OF THE INVENTION

The present invention relates generally to a signal transmission over an optical fiber system implemented with optical fibers and related optical components. More particularly, this invention relates to a new tap output optical collimator with improved configurations for low cost production.

BACKGROUND OF THE INVENTION

For optical signal transmission over an optical fiber system, there is a need to monitor the optical power in and out of optical devices or an optical system such as fiber amplifier and variable attenuator. A common method employed in conventional fiber optical system is to connect a tap optical coupler to the input end or/and the output end of the fiber pigtail of the devices or the system. A small amount of light power is directed from the input or output as a reference to monitor the input or/and output optical power. Such approach however suffers several drawbacks. The size of the sign transmission is increased when one more optical element is added. Stability of optical signal transmission and tapped output measurement may be degraded if the coupling between the tap coupler to the collimator is not properly connected. Signal power loss may also occur due the requirement of transmitting the signal through the tap optical coupler as an additional optical element. The simplest way to solve the problem is to use taped optical collimator to assemble the device that has built-in tap collimator to direct a portion power from input or/and output side. The tap-input collimator is commercially available. It is made by a dual fiber collimator in that two fibers are placed side by side in parallel in a glass capillary and share a same collimator lens, preferably the GRIN lens. When an input light is coupled into one fiber of such input tap collimator, since the fiber Is positioned in the dual core glass capillary and the fiber core is off-axis of the GRIN lens, the collimated beam has a declined angle against the axis of GRIN lens. A part of the beam is reflected from the far-end of GRIN lens surface or from a partial reflector glued on the GRIN lens surface. The reflected part of the beam receives a equal opposite decline angle from the reflector and is focused by the same GRIN lens to another finer in the glass capillary. The second fiber is the tap fiber carrying the tap power. The main portion of the light pass through the partial reflection glass piece to provide ongoing collimated beam.

However, the tap-output collimator is not yet made available mainly because of difficulties to divide incoming light beam into two beams in proper ration with opposite declined angle to project two beams into two fibers in a dual fiber glass capillary respectively.

For these reasons, there is a need in the art of optical fiber signal transmission to provide a new and improved apparatus and method for tapping out a small portion of received signal power from a collimator for measuring and monitoring the optical signal transmission. Preferably, the new and improved configurations and methods are simple and easy to implement with compact configuration for low cost production.

SUMMARY OF THE PRESENT INVENTION

It is therefore an object of the present invention to provide a new and improved design and configuration for manufacturing and assembling a tap output collimator for directly projecting a small portion of optical beam to a tap output fiber for measuring and monitoring the signal transmission. By integrating a function of tap-out projection to a collimator, a stable, low cost and simplified configuration and process of manufacture are achieved and the difficulties of the prior art are resolved.

Specifically, it is an object of the present invention to integrate a means for tap-out projection to a collimator by building into the collimator a means for projecting a small portion of light beam to a tap-out fiber for measurement. The tap-out projection can be implemented with many types of optical arrangements. In one preferred mbodiment, the tap-out projection is integrated with the collimator by a prism. In another preferred embodiment, the tap-out projection is implemented with a built-in reflection mirror. By integrating the tap-out projection function into a collimator, the size and production cost of tap out monitoring are reduced, more stable operation is achieved and the transmission loss is reduced.

Briefly, in a preferred embodiment, the present invention includes a tap output collimator. The tap output collimator includes a means for projecting a portion of an incident optical beam into a tap output fiber for monitoring an optical signal transmitted to the tap output collimator. In a preferred embodiment, the means for projecting a portion of the optical output is a prism having a first and second inclined surfaces for projecting the portion of the incident-light beam through the first inclined surface into the tap output fiber. The prism is further used for projecting another portion of the incoming light beam through the second declined surface into the main output fiber. In a preferred embodiment, the prism is disposed in front of the tap output collimator with the first incline surface and the second incline surface. The position of the prism is arranged to have a surface area ratio relative to an incoming optical beam and the ratio is corresponding to a tapping out radon for projecting a predefined tapping out ratio of optical transmission to the tap out optical fiber.

In summary, this invention discloses an optical component that includes a built-in tap-out projection optical arrangement for projecting a portion of an incoming beam to a tap-out fiber and for projecting another portion to main transmission fiber. In one of the preferred embodiments, the built-in tap-out projection optical arrangement further includes a front surface having an incline angle for projecting a portion of an incoming beam to a tap-out fiber and another portion to main transmission fiber. In another preferred embodiment, the built-in tap-out projection optical arrangement further includes a prism having a pair of inclined front surfaces for projecting the incoming beam into an output beam and a tap out beam. In yet another preferred embodiment, the built-in tap-out projection optical arrangement further includes a partially reflective front surface and a reflective mirror projecting the incoming beam into an output beam and a tap out beam.

This invention further discloses a method of configuring an optical component for receiving an incoming optical signal by providing a means for projecting a tap-out portion of the incoming optical signal into a tap output detecting and measuring means. The tapping out portion is then used for detecting and measuring a power of the optical signal transmitted out from the optical component.

This invention further discloses a configuration of dual beam collimator that provides dual parallel, collimated beams from one collimator lens with adjustable distance between each other. The dual beam collimator benefits the optical component such as optical switches that require dual light beams separated by small distance.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
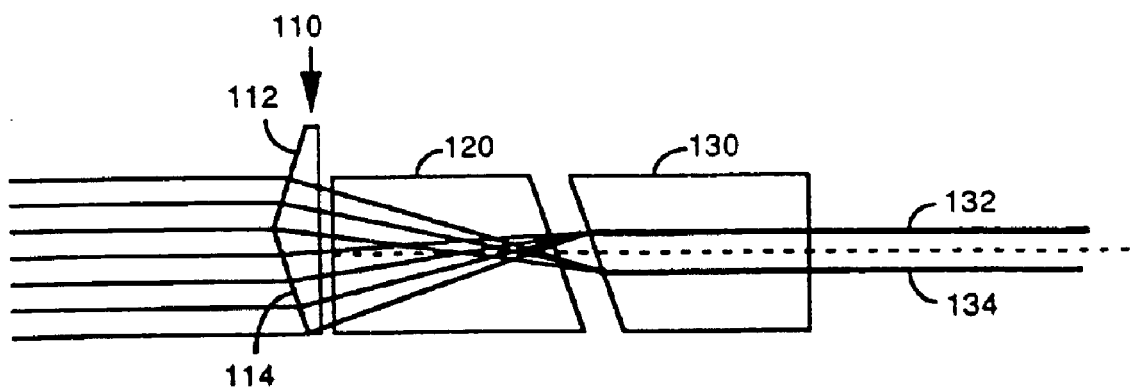
FIG. 1 is a cross sectional view of a tap collimator of this invention.

Referring to FIG. 1 for a cross sectional view for showing the basic structure and optical path of a polarization-independent tap output collimator. For the sake of clarity, a simpler term of "tap collimator" will be used for describing this new collimator of this invention. The tap collimator includes a glass prism 110 for dividing an incoming beam into two portions and for providing each portion of beam a decline angle. The prism has an upper inclined surface 112 and a lower inclined surface 114 with the upper inclined surface projecting a first portion of the light beam as a downward-projecting beam with a small downward angle. And, the lower inclined surface projecting a second portion of the light beam as an upward-projecting beam with a small upward incline angle. A GRIN lens 120 is placed right next to the prism 110 and a dual-fiber capillary 130 is placed next to the GRIN lens 120. The dual-fiber capillary 130 carries a first fiber 132 and a second fiber 134 side by side. The optical fiber consists of optical core that transmits the light and a cladding layer surrounds the core to prevent the light from leaking out of the core. For a single mode fiber that is popularly used in optical communication system, the diameter of the core is typically around ten micrometers wrapped by cladding layer extended to 125 micrometers. Therefore, the fiber core of both fibers in a dual fiber glass capillary are off axis of the capillary, If the capillary axis is aligned to that of collimator lens, the core of the fiber 132 is slightly higher than the central axis of the GRIN lens and the core of the second fiber 134 is slightly lower than the central axis of the GRIN lens. Accordingly, following the basic principle of optical transmission, the declined light beam can be adjusted to focus into off-axis fiber core by the collimator lens. The distance between two fiber cores, the power of collimators lens, and the diffraction index of the prism material determine the inclined angles of the prism. The GRIN lens 120 receives the downward-projecting beam and the upward projecting beam horn the prism 110 and focuses the downward-projecting beam to the second fiber 134. Meanwhile, the GRIN lens receives the upward projecting beam and focuses the upward projecting beam to the first optical fiber 132. The power ratio of beams, when separated into the downward projecting beam and the upward projecting beam, depends on the relative position of the prism 110 and the optical axis of the GRIN lens 120. FIG. 1 shows that the prism 120 is located at an off-axis position relative to the optical-axis of the GRIN lens 120 and the upward projecting beam has a much greater beam intensity than the downward projecting beam. For the purpose of generating a taped output to monitor the power transmitted from the collimator, a small amount of beam is projected to the optical fiber 134 slightly below the central axis. The light beam received by the optical fiber 134 is than guided to an optical detector for beam intensity measurement. Suppose the ratio between the intensities $I_1$ and $I_2$ of the light beams projected to the upper and lower optical fibers 132 and 134 is $\alpha$, $I_1/I_2=\alpha$ and the ratio $\alpha$ can be a predefined value. The ratio can be calculated by light beam distribution, typically a Gaussian distribution, and a ratio of the light exposure areas A1 and A2 of the upper and lower incline surface 112 and 114. Since some scattering losses caused by vertex angle of the prism, the tap ratio can be determined by instant adjustment when the tap collimator is assembled. Some time, the scattering loss is as large as few percent of total power, such loss is not acceptable in some case. This problem can be solved in another embodiment in this invention.

Figure 2:
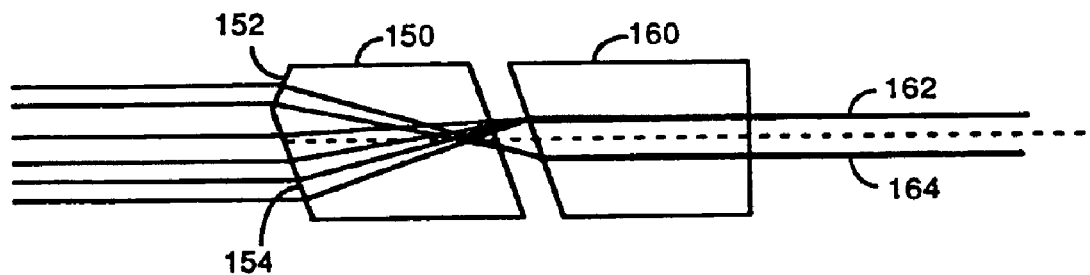
FIG. 2 is a cross sectional view of a different embodiment of a tap collimator of this invention.

According to the above optical configuration, FIG. 2 shows an alternate preferred embodiment of this invention by polishing the GRIN lens 150 to have an upper incline surface 152 and a lower incline surface 154. Again, an incoming light beam to the collimator is now deflected by the upper and lower incline surfaces 152 and 154 to a lower and upper optical fiber 164 and 162 respectively in a dual fiber capillary 160. The beam tapped out from the optical fiber 164 can be measured for a determination of the beam intensity transmitted to the tap collimator.

Figure 3:
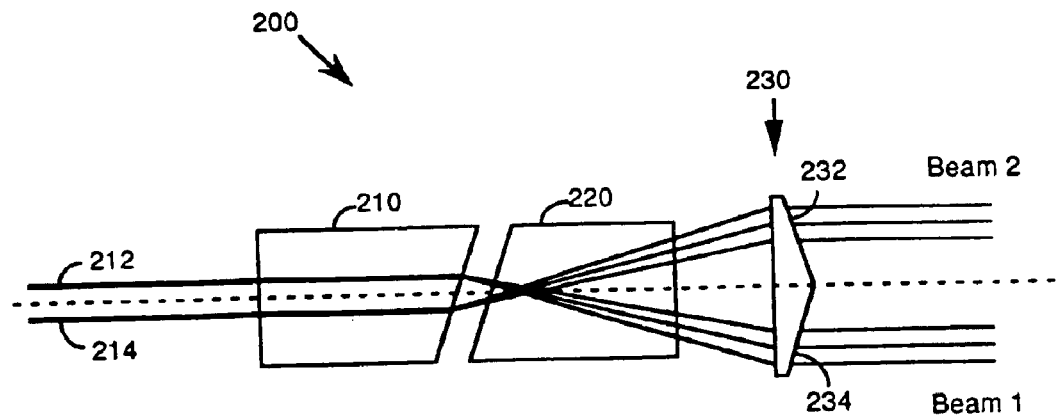
FIG. 3 is a cross sectional view of another embodiment of a dual fiber collimator of this invention.

FIG. 3 shows a dual beam collimator as a different embodiment of this invention with a configuration that processes the beam in a converse order compared to the embodiment shown in FIG. 1. The dual fiber collimator 200 includes a dual fiber capillary 210 with dual optical fibers 212 and 214 for transmitting two light beams to a GRIN lens 220 ranged in a defocusing orientation. As described in the first embodiment, a core of fiber 212 is upper of GRIN lens axis and core of fiber 214 is lower of GRIN lens axis. If both fibers are around the focus point and symmetrical to leans axis, the light from fiber 212 is collimated by lens with downward angle and the light from fiber 214 is collimated by the lens with upward angle. The prism 230 is placed before the lens with certain distance, so that the downward light beam strikes on the decline surface 234 where the downward light beam is bent to be parallel to axis of the lens. And, the upward beam strikes on the decline surface 232 and the upward beam is bent to be parallel to the system axis also. Furthermore, the distance between the beams can be adjusted by adjusting the distance between the GRIN lens 220 and the prism 230. By this invention, one collimator in conventional size provides two parallel collimated beams that is critical in some applications such as optical switches. The dual beam collimator can be expanded to multiple-beam collimator in which multiple-fibers share one collimators lens. In this configuration, multiple-fibers are placed in planar in multiple-fiber capillary. One fiber is on the central axis of the capillary and others are off-axis. The collimator lens collimator the lights from the multiple-fibers to emit multiple beams, each has different declined angle against the axis of collimator lens except the beam collimated from the fiber on axis. The beams are bent by multiple-phase prism to be parallel to each other. The prism has flat part in central normal to beam from the on-axis fiber and has several pairs of incline surfaces that are symmetrical to central axis. Each pair of inclined surface has different angle to match the angles of the beam from off-axis fibers.

Figure 4:
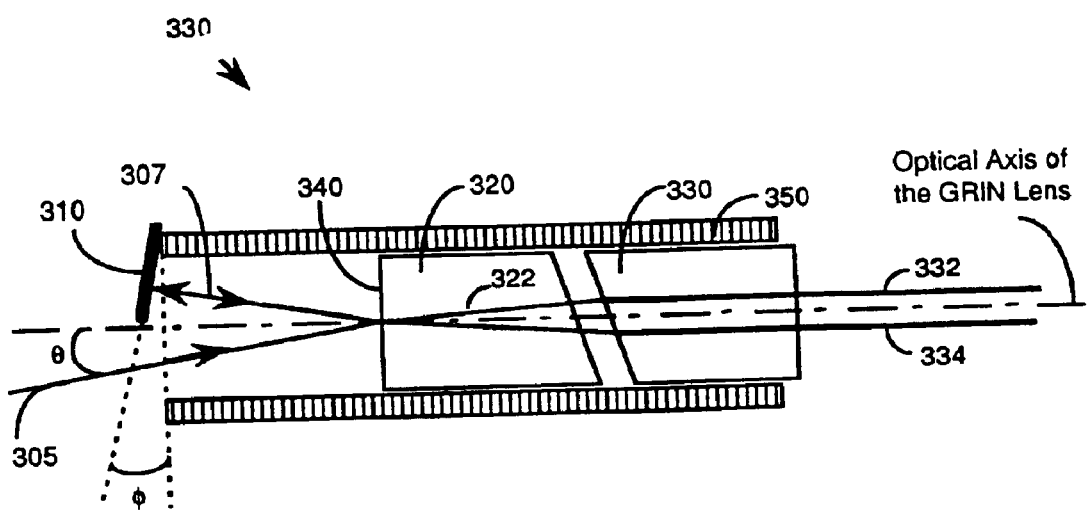
FIG. 4 is a cross sectional view of another embodiment of a tap collimator of this invention.

FIG. 4 shows the basic configuration and, optical paths of a different tap collimator 300 of this invention. The tap collimator 300 includes a GRIN lens 320 placed next to a dual fiber capillary 330 at position around the focus point of the GRIN lens held inside a holding table 350. The dual fiber capillary has a first fiber 332 and a second fiber 334 disposed respectively at an upper and lower position relative to the central optical axis of the capillary and the GRIN lens. The fiber 332 is defined as receiving fiber and the fiber 334 is defined as the tap fiber to receive the tap power for monitoring. As described in previous embodiments, the receiving fiber is up of GRIN lens axis, if the collimator is aligned to incoming light beam 305, the beam must have a decline angle θ against the GRIN lens front surface. The front surface of the GRIN lens is coated with a partial reflective surface 340 to reflect a beam 307, a portion of beam 305 to a mirror 310 attached to the first end of the holding tube 350. The mirror 310 is attached to the holding tube 350 with a small incline angle φ, relative to an axis perpendicular to the optical axis of the GRIN lens 320. The angle φ is set to equal θ so that the mirror 310 then directly reflects the beam 307 back in the same path to the collimator that focuses the tap power into tap fiber 334 that is at lower than GRIN lens axis and requires incident angle of θ for receiving. The tap energy received by the second fiber 334 can be calculated as $R_G R_M (1-R_G) C$ where $R_G$, $R_M$ and C are respectively the reflection ratio of the coated front surface 340 of the GRIN lens, the reflection ratio of the mirror 310 and the excess loss in alignment The minor 310 can be adjusted to achieve a minimum alignment loss by completely reflecting the optical beam 307 to the second optical fiber 334. The second optical fiber 334 directs the tap output beam to an optical detector for measuring the beam intensity for determining the beam intensity of 305 and 322 transmitted to the first optical fiber 332.

According to FIG. 1, this invention discloses a new and improved tap output collimator that includes a glass prism having a first incline surface and a second incline surface. These incline surfaces are used for dividing an input light beam into two parts and providing each part with a small downward projecting angle to one part and an upward projecting angle to another part. The tap output collimator further includes a GRIN lens for focusing the upward and downward projecting beams into an output optical fiber and a tap out optical fiber respectively. In a preferred embodiment, the tap output collimator further includes a dual fiber capillary disposed at an output end of the GRIN lens. The dual fiber capillary is used for containing and disposing the output optical fiber and the tap out optical fiber on a focal point of the GRIN lens. In a preferred embodiment, the tap ratio can be calculated by light beam distribution, typically a Gaussian distribution, and the area ratio between the first decline surface and the second decline surface.

According to FIG. 2, this embodiment discloses a new and improved tap output collimator that includes a GRIN lens having a first incline surface and a second incline surface. These two surfaces are used for separating and projecting the input light beam into a downward projecting beam with a small downward projecting angle and an upward projecting beam with an upward projecting angle. The GRIN lens is further used for focusing the upward and downward projecting beams into an output optical fiber and a tap out optical fiber respectively. In a preferred embodiment, the tap output collimator further includes a dual fiber capillary disposed at an output end of the GRIN lens. The dual fiber capillary is used for containing and disposing the output optical fiber and the tap out optical fiber on a focal point of the GRIN lens. In a preferred embodiment, the first incline surface and second incline surface having a surface area ratio that is corresponding to a tap out ratio for projecting a portion of the input light beam to the tap out optical fiber according to the tap out ratio. In a preferred embodiment, the tap output collimator further includes an optical signal detector for measuring the downward projecting light beam projected to the tap out optical fiber.

In essence, this invention discloses an optical component that includes a built-in tap-out projection means for projecting a portion of an incoming beam to a tap-out beam transmission means. In one of the preferred embodiments, the built-in tap-out projection means further comprises a front surface having an incline angle for projecting a portion of an incoming beam to a tap-out beam transmission means. In another preferred embodiment, the built-in tap-out projection means further comprises a prism having a pair of inclined front surfaces for projecting the incoming beam into an output beam and a tap-out beam. In yet another preferred embodiment the built-in tap-out projection means further comprises a partially reflective front surface and a reflective mirror projecting portion of an incoming beam into a tap out fiber. Therefore, this invention discloses an optical component including an integrated tap-out projection means for projecting a portion of an incoming signal to a tap-out signal transmission means.

Therefore, the present invention discloses an improved design and configuration for manufacturing a tap output collimator for directly projecting a small portion of optical beam to a tap output fiber for measuring and monitoring the signal transmission. By integrating a function of tap-out projection to a collimator, a stable, low cost and simplified configuration and process of manufacture are achieved and the difficulties of the prior art are resolved. Specifically, a means for tap-out projection to a collimator is built into collimator for projecting a small portion of light beam to a tap-out fiber for measurement. The tap-out projection can be implemented with many types of optical arrangements such as a prism. The tap-out projection may also be implemented with a built-in reflection mirror. By integrating the tap-out projection function into a collimator, the size and production cost of tap out monitoring are reduced, more stable operation is achieved and the transmission loss is reduced. The present invention discloses design and configuration for manufacturing dual beam collimator that provides two parallel beams with adjustable distance between beams in the same diameter as the single beam collimator.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A tap output collimator, comprising:
   a GRIN lens having a first side including a first planar incline surface and a second planar incline surface for receiving an input light beam for separating and projecting the input light beam into a downward projecting beam with a small downward projecting angle and an upward projecting beam with an upward projecting angle and for focusing the upward and downward projecting beams into an output optical fiber and a tap output optical fiber respectively.

2. The tap output collimator of claim 1, further comprising:
a dual fiber capillary positioned at an output end of the GRIN lens for holding and positioning the output optical fiber and the tap output optical fiber on a focal point of the GRIN lens.

3. The tap output collimator of claim 1, wherein
the first planar incline surface and the second planar incline surface have a surface area ratio corresponding to a tap output ratio for projecting a portion of the input light beam to the tap output optical fiber according to the tap output ratio.

4. The tap output collimator of claim 1, further comprising:
an optical signal detector for measuring the downward projecting light beam projected to the tap output optical fiber.

5. A multiple beam collimator, comprising:
a GRIN lens for collimating input light from a plurality of optical fibers;
a glass prism having a first side including at least one surface normal to a central axis of a collimator and a second side including a plurality of incline surfaces, the glass prism operable to receive, at the first side, one or more upward and downward collimated light beams from the GRIN lens and transmit light beams, refracted parallel to the central axis, from the plurality of incline surfaces of the second side.

6. The multiple beam collimator of claim 5, further comprising:
a multiple fiber capillary disposed at an input end of the GRIN lens for holding and positioning one or more optical fibers.

7. A tap output collimator, comprising:
a GRIN lens for receiving an input beam with a small incident angle relative to an optical axis of the GRIN lens;
a lens holder for holding the GRIN lens having a front portion extended beyond a front surface of the GRIN lens for holding a reflecting mirror at a distance away from the front surface of the GRIN lens;
the reflective mirror is disposed at a small incline angle relative to a perpendicular line to the optical axis of the GRIN lens; and
the GRIN lens further having a partially reflecting front surface for transmitting an output beam through and reflecting a portion of the input beam to the reflective mirror for reflecting the portion of the input beam into the GRIN lens with a tap output optical path separated from the incoming beam.

8. The tap output collimator of claim 7, further comprising:
a dual fiber capillary disposed at an output end of the GRIN lens for containing and disposing a set of dual optical fibers at the output end of the GRIN lens for receiving the output beam and the tap output beam from the GRIN lens.

9. The tap output collimator of claim 7, wherein:
the partially reflecting front surface of the GRIN lens having a ratio of transmission to reflection corresponding to a tap output ratio for projecting a portion of the input beam to a tap output optical fiber according to the tap output ratio.

10. The output collimator of claim 7, further comprising:
an optical signal detector for measuring the output beam projected to a tap output optical fiber.

* * * * *